United States Patent [19]
Gerster

[11] 3,917,609

[45] Nov. 4, 1975

[54] PYRROLOQUINOLINE CARBOXYLIC ACIDS AND DERIVATIVES

[75] Inventor: John F. Gerster, Woodbury, Minn.

[73] Assignee: Minnesota Mining and Manufacturing Company, St. Paul, Minn.

[22] Filed: June 27, 1973

[21] Appl. No.: 373,980

[52] U.S. Cl. ..260/287P, 260/247.5GP, 260/268.13Q
260/326.11; 260/288 AN; 260/240;
260/326.13; 424/258
[51] Int. Cl.² .................................... C07D 215/14
[58] Field of Search .................... 260/287, 287 P

[56] References Cited
UNITED STATES PATENTS

| | | | |
|---|---|---|---|
| 2,245,261 | 6/1941 | Dickey et al. | 260/287 CF |
| 2,494,801 | 11/1974 | Fisher | 260/287 R |
| 2,494,801 | 11/1950 | Fisher | 260/287 AN |
| 2,614,121 | 10/1952 | Price et al. | 260/287 AN |
| 3,793,328 | 2/1974 | Hester | 260/287 CF |

OTHER PUBLICATIONS

J. Med. Chem. 9(1), 140, (1966).

Primary Examiner—Richard J. Gallagher
Assistant Examiner—David E. Wheeler
Attorney, Agent, or Firm—Alexander, Sell, Steldt & DeLaHunt

[57] ABSTRACT

Certain substituted 1,2-dihydro-6-oxo-6H-pyrrolo-[3,2,1-ij]quinoline-5-carboxylic acids and their salts, and hydrazides thereof, intermediates for and a process for their preparation are described; the end products are active anti-bacterial agents.

18 Claims, No Drawings

PYRROLOQUINOLINE CARBOXYLIC ACIDS AND DERIVATIVES

BACKGROUND OF THE INVENTION

The heterocyclic system 6H-pyrrolo[3,2,1-ij]quinoline is known, e.g. as reported in J. Chem. Soc. 1952, 1870. Additional derivatives of this ring sysytem are reported by Rapoport and Tretter, J. Org. Chem., 23, 248 (1958) and by Astill and Bockelheide, J. Org. Chem. 23, 316 (1958).

This invention relates to substituted derivatives of the pyrrolo[3,2,1-ij]quinoline heterocyclic system. More specifically it relates to 1,2-dihydro-6-oxo-6H-pyrrolo[3,2,1-ij]quinoline-5-carboxylic acids and salts, hydrazides, hydrazones, amides and esters thereof. These compounds are optionally substituted at the 2, 7, 8 or 9 positions. The use of the compounds as antibacterial agents or as intermediates for antibacterial agents, the use of pharmaceutical compositions containing the antibacterial compounds and the preparation of these compounds are included within the scope of the invention.

DETAILED DESCRIPTION OF THE INVENTION

This invention is specifically concerned with derivatives of 1,2-dihydro-6-oxo-6H-pyrrolo[3,2,1-ij]quinoline. The structure and numbering system for this ring system are:

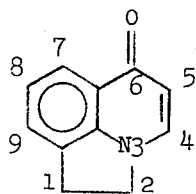

The compounds of the invention have the following structure (hereinafter termed Formula I):

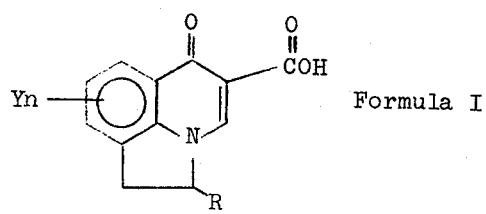

wherein R is hydrogen, methyl or ethyl; Y is lower alkyl, lower alkoxy, halogen, hydroxy, nitro, cyano, trifluoromethyl, amino, lower alkanamido, or N,N-lower dialkylamino; n is zero, one or two; and when $n$ is two, Y may be methylenedioxy ($-OCH_2O-$) or ethylenedioxy ($-OCH_2CH_2O-$) bonded to adjacent ring positions; and esters, pharmaceutically acceptable salts, acyl halides, acyl hydrazides and hydrazone derivatives thereof or amides thereof with respect to the carboxyl group.

As used herein, "lower" with respect to alkyl means having from 1 to 6 carbon atoms; and "halogen," "halide," or "halo" means fluorine, chlorine, bromine and/or iodine as such or as a substituent.

The acidic compounds of the invention are all active as antibacterials. The derivatives of the acids are either so active or are useful intermediates for the preparation of the acidic antibacterial agents.

Presently preferred as antibacterial agents are compounds of the invention having the following structure (hereinafter termed Formula II):

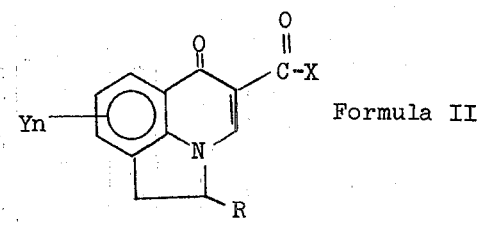

wherein R is hydrogen, methyl, or ethyl; Y is methyl, methoxy, fluorine, chlorine or acetamido; $n$ is one or two, and when $n$ is two, each Y may be the same or different, or Y may be methylenedioxy or ethylenedioxy bonded to adjacent ring positions; and

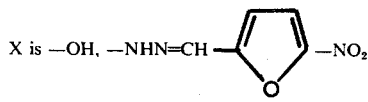

or -OM, wherein M is a pharmaceutically acceptable cation.

Compounds of Formula II wherein X is $-OH$ or $-OM$ comprise a class of compounds which are of particular interest because they have useful antibacterial activity against gram negative organisms. Such activity is of interest, for example, for treatment of infections of the mammalian urinary tract. Within this class, especially preferred compounds are those wherein n is one, Y is methyl, methoxy, chlorine, fluorine, or acetamido and R is methyl.

Compounds of the invention wherein X is

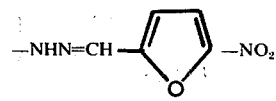

are preferred hydrazone derivatives particularly active against gram positive organisms, and compounds of this class which are active have as other substituents Y and R a broad range wherein R is methyl, ethyl, or hydrogen, Y is lower alkyl, lower alkoxy, halogen, hydroxy, nitro, cyano, trifluoromethyl, amino, lower alkanamido, or N,N-lower dialkylamino, $n$ is zero, one or two and when $n$ is two Y may be methylenedioxy ($-OCH_2O-$) or ethylenedioxy ($-OCH_2CH_2O-$) bonded to adjacent ring positions.

Compounds of the invention which are ester, acyl halide, amide or acyl hydrazide or hydrazone derivatives thereof of the acids of Formula I may be antibacterial agents per se, but in any case they are all useful compounds for conversion to the corresponding acids. The free acids generally show superior in vitro antibacterial activity over said derivatives, except for the hydrazones, which may show increased potency and/or a different spectrum of antibacterial activity.

However, pharmaceutically useful salts such as the sodium, potassium, calcium, ammonium, isopropanolamine and the like salts show increased solubility in aqueous media. Such pharmaceutically useful salts are preferred, although other salts can be prepared and are useful e.g. for in vitro applications. Other derivatives such as the esters have solubility in organic solvents which is different from that of the acids or their salts. Accordingly these derivatives have special characteristics useful for particular applications, as known to the pharmaceutical art.

Compounds of the invention of Formula I in the acid form where n is zero are generally somewhat less active as antibacterials than the corresponding compounds wherein n is one. However, these compounds are useful intermediates also, since they can be nitrated readily on the benzo ring and the nitro substituents can be converted to amino, alkanamido, halogen, cyano and other substituents.

Compounds of the invention wherein the amido group is substituted are preferably substituted by one or two lower alkyl groups, or the amido nitrogen is part of a 5- or 6-membered cyclic system such as piperidino, pyrrolidino, piperazino, morpholino and the like.

In compounds of the invention wherein R is methyl or ethyl, carbon 2 is an asymmetric carbon atom, providing optically active stereoisomers. It is found that one of the stereoisomers is much more active as an antibacterial agent, but the mixture of stereoisomers is generally conveniently used to obtain anti-bacterial action.

The anti-microbial activity of the compounds of the present invention can be demonstrated by the known, standard plate dilution method for bacterial susceptibility to antibiotics. The culture medium employed permits susceptibility testing of fastidious microorganisms towards antibiotics, sulfonamides and other chemotherapeutic agents. Tryptone soy agar (oxoid) of the following composition is the culture medium.

| | |
|---|---|
| oxoid tryptone | 15 g. |
| oxoid soy peptone | 5 g. |
| sodium chloride | 5 g. |
| oxoid agar-agar No. 3 | 15 g. |
| water | 1 liter |

Using this test, the compounds of the invention have been found to have activity against gram-positive and gram-negative micro-organisms.

The compounds of the invention are active against microorganisms either in the absence and/or presence of ten percent horse serum.

The test procedure used to determine activity as employed in connection with the present invention provides information on the amount of a compound required to give complete inhibition, partial inhibition or no inhibition of microbial growth on the agar plates. In the tests the selected compound is added to the agar medium to give concentrations of zero, one, ten and one hundred milligrams per liter. A series of plates with these concentrations is prepared. Ten percent horse serum is added to one series of such plates. Aliquots of broth culture of each of nine species of microorganisms are inoculated onto the agar plates containing the various compound concentrations. The plates are incubated at 37° C. in a ten percent carbon dioxide atmosphere for 18 to 24 hours. The microbial growth on each plate is read visually and minimal inhibitory concentrations are recorded.

The microorganisms used for this test were:
1. *Staphylococcus aureus*
2. *Bacillus subtilus*
3. *Pseudomonas aeruginosa*
4. *Escherichia coli*
5. *Streptococcus sp**
6. *Aspergillus niger*
7. *Candida albicans*
8. *Mima polymorpha*
9. *Herellea vaginicola*
10. *Klebsiella pneumoniae*
11. *Streptococcus fecaelis*

*Strains isolated from dental caries in rats or hamsters at the National Institute of Dental Health and grown in PFY or APT agar.

All of the compounds of the invention possess activity towards one or more of the above microorganisms.

Many of the compounds of the invention have also shown activity towards anaerobic bacteria, for example, *Bacteroides sp.* and *Clostridium welchii.*

It will be understood by those in the art that the species used are representative indicator species, as it would be impractical to screen against all bacteria. It is well known in the art that it can be concluded that a component has a broad spectrums activity based on activity shown against many or most of selected representative bacterial species of various types as described herein.

Many of the compounds of the invention, particularly those of Formula II, are active when administered orally to animals. They are excreted at least in part in active form in the urine, and are effective urinary tract antibacterials in mammals.

All of the acid form compounds of the invention are active against microorganisms in vitro or topically. In vitro activity is useful in itself, since antibacterial agents may be used for disinfecting and sterilizing, for example medical and dental equipment, as components of disinfecting solutions.

The acidic compounds of the invention are ordinarily white or yellowish to brown crystalline or amorphous solid materials when purified. They are substantially insoluble in water, lower alcohols or hydrocarbons and are more soluble in halogenated solvents, dimethylformamide and the like. The esters and amides are generally somewhat more soluble in organic solvents. The alkali metal salts have appreciable solubility in water and lower alcohols.

The compounds of the invention may be formulated for use as antibacterial preparations by incorporating them into conventional pharmaceutical carrier materials, either organic or inorganic, which are suitable for oral, topical, or intraperitoneal application. For in vitro or topical use, simple solutions or suspensions are most conveniently employed. For this purpose, concentrations of the order of 100 parts per million are suitable, and the formulations is used by immersing objects to be treated therein, or by local application to an infected area.

The amount of compound to be used for, e.g., oral treatment of a microbial urinary infection will be an effective amount less than a toxic amount. The amount to be administered to control an infection will depend on the species, sex, weight, physical condition and many other factors, but this judgment is well within the skill of the medical art. Usually the amount will be less than 200 mg/kg per dose.

Acute oral toxicity of some of the acid form compounds of the invention has been determined in mice and it is generally greater than 600 mg/kg.

It is known to the art that anti-microbial agents are used as growth promoters when given orally in various animal and bird species, e.g., in animal or fowl feed or water. It is expected from the outstanding antimicrobial activity that the compounds of the invention can be used for this purpose also. The compounds of the invention may also be used for the control of microbial (e.g. *Erwinia amylovera*) infections of plants, e.g. by spraying or dusting formulations of these compounds on the affected area. Activity of this type is indicated by in vitro test results.

The compounds of the invention are prepared starting with an indoline compound as illustrated by the following reaction sequence, in which Y and R have the same significance as hereinabvoe, and "alk" means hereinabove, alkyl, preferably ethyl.

it will undergo in order to provide compounds of the present invention will be obvious to those skilled in the art.

Compounds of the invention wherein Y is lower alkanamido are prepared by the reaction of the corresponding aromatic amines with lower acyl halides or anhydrides.

Compounds of the invention wherein Y is hydroxy may be prepared by simple cleavage of the corresponding alkoxy compounds using well-known methods, for example heating with hydrobromic acid.

Compounds of the invention wherein Y is nitro are optionally prepared by direct nitration of other compounds of the invention, and the corresponding amino

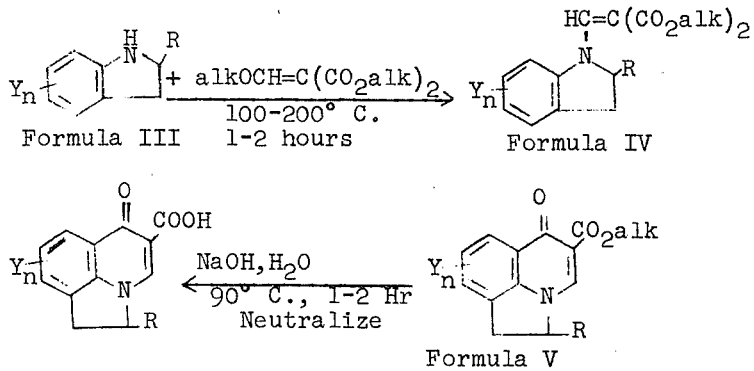

In the above reaction sequence a dialkyl alkoxymethylenemalonate is condensed with an indoline of Formula III by heating without solvent at 100° to 200° C. for one to five hours. The resulting novel intermediates, formula IV, are generally oils which need not be isolated or purified. Instead, polyphosphoric acid is added, and the solution is heated at 100° to 140° C. to effect a condensation to the esters of Formula V. The novel esters of Formula IV are likewise included within the scope of the invention. They are readily purified as by recrystallization or chromatography.

The final step, if desired, is saponification of the esters of Formula V to the acids of Formula I. Other lower alkyl esters, and salts with metals or amines, can be prepared from the acids by known methods, e.g. simple neutralization with an equivalent of base in an organic solvent, followed by evaporation.

Amides of the acidic compounds of the invention are prepared by conventional techniques, e.g. by reacting the corresponding acid of Formula I with e.g. thionyl chloride, then reacting the acid chloride with ammonia or an amine to provide the amide.

Many indolines of Formula III are known. See, for example J. Am. Chem. Soc. 83, 3319 (1961), J. Med. Chem. 9 (1), 140 (1966), Zhur. Obshchei Khim. 29, 2541 (1959) (Chem. Abs. 54, 10991.) and Nippon Kagaku Zasshi 78, 1372 (1957) (Chem. Abs. 54, 491. Others may be prepared by known procedures from known intermediates. For example, compounds of Formula III may be conveniently prepared by catalytic or chemical reduction of indoles, or by acid-catalyzed rearrangement of N-2-alkenylanilines.

Alternatively, compounds of the invention are prepared from other compounds of the invention using known synthetic techniques. The pyrrolo[3,2,1-ij]quinoline nucleus is reasonably stable to strongly acidic, neutral, mildly basic and reducing conditions. Using this information, many chemical reactions which derivatives may be formed for example, by reduction of the nitro group with basic Raney nickel. Compounds of the invention wherein Y is amino may also be converted by known methods through the diazonium salts to compounds wherein Y is cyano or halogen.

Compounds of the invention wherein Y is amino may be converted to compounds of the invention wherein Y is dialkylamino by conventional methods.

Hydrazides of the invention are prepared by conventional methods e.g. by reacting the corresponding ester with hydrazine in a suitable solvent such as an alcohol.

Derivatives wherein X is 5-nitrofurfurylidene hydrazide are prepared by reacting the corresponding hydrazide of the acid of Formula I with 5-nitrofurfuraldehyde.

Amides of the invention are prepared from esters, acyl halides, salts, hydrazides or other amides of the invention by known methods.

It is well known to the art that pharmaceutically acceptable salts such as alkali metal, alkaline earth, aluminum, iron and other metal and amine salts of pharmaceutically active acids are the equivalents of the acids, and in some cases may even offer advantages in absorption, formulation, and the like.

Salts of the free acid compounds of the invention are readily prepared by reaction of the acid with a base and evaporation to dryness. The base may be organic, e.g. sodium methoxide or an amine, or inorganic.

The following non-limiting examples are provided to illustrate the synthetic methods useful to obtain compounds of the invention, and the compounds thus obtained.

EXAMPLE 1

A mixture of indoline (23.8 g. 0.20 mole) and diethyl ethoxymethylenemalonate (43.2 g, 0.2 mole) is heated at 125° to 130° C. for 3 hours. Polyphosphoric acid (200 g) is then added and the mixture is heated at 175° to 185° C. for about 1 hour. The solution is poured into 300 ml. of water, then neutralized with 40% sodium hydroxide solution. The ester precipitates and is separated by filtration. The solid is treated with 10% sodium hydroxide solution and heated on a steam bath for 1 hour, then treated with decolorizing charcoal and filtered. The filtrate is neutralized with 6N hydrochloric acid, then the precipitated product is separated by filtration. The solid is washed with water, then ethanol, and recrystallized from N,N-dimethylformamide to provide 1,2-dihydro-6-oxo-6H-pyrrolo[3,2,1-ij]quinoline-5-carboxylic acid, m.p. 277°–279° C.

Analysis: Calculated for $C_{12}H_9NO_3$: %C, 67.0; %H, 4.2; %N, 6.5; Found: %C, 67.0; %H, 4.0; %N, 6.4.

EXAMPLE 2

A mixture of 2-methylindoline (25.0 g, 0.188 mole) and diethyl ethoxymethylenemalonate (40.5 g, 0.188 mole) is heated at 110° C. for 1 hour. Polyphosphoric acid (200 g) is added and the solution is heated with occasional stirring to 115° C. and maintained at 115° to 125° C. for 1 hour. The solution is poured into 500 ml. of water, then neutralized with 10 percent sodium hydroxide. The precipitate is isolated by filtration, washed with water and recrystallized from a mixture of dichloromethane and hexane to provide tan solid ethyl 1,2-dihydro-2-methyl-6-oxo-6H-pyrrolo[3,2,1-ij]quinoline-5-carboxylate, m.p. 162° to 165° C.

Analysis: Calculated for $C_{15}H_{15}NO_3$: %C, 70.0; %H, 5.0; %N, 5.45; Found: %C, 69.7; %H, 5.7; %N, 5.4.

The ester is dissolved in 10% sodium hydroxide solution and the mixture is heated on a steam bath for 1 hour. The solution is treated with decolorizing charcoal, filtered, then neutralized with concentrated hydrochloric acid. The yellow product is isolated by filtration, washed with water and recrystallized from N,N-dimethylformamide to provide 1,2-dihydro-2-methyl-6-oxo-6H-pyrrolo[3,2,1-ij]quinoline-5-carboxylic acid, m.p. 294° to 295° C. (dec).

Analysis: Calculated for $C_{13}H_{11}NO_3$: %C, 68.2; %H, 4.8; %N, 6.1; Found: %C, 68.3; %H, 4.6; %N, 6.0.

EXAMPLE 3

1,2-Dihydro-2-methyl-6-oxo-6H-pyrrolo[3,2,1-ij]quinoline-5-carobyxlic acid (14.8 g, 0.0645 mole) is dissolved in 100 ml. of concentrated sulfuric acid and a solution of 12.5 ml. of 70% nitric acid in 45 ml. of concentrated sulfuric acid is added dropwise with stirring at about 40° C. After the addition is complete the solution is stirred at about 25° C. for 15 minutes, then poured over ice. The mixture is partially neutralized, the yellow precipitate is separated by filtration, washed with hot water, then ethanol and finally diethyl ether. Recrystallization from N,N-dimethylformamide provides 1,2-dihydro-2-methyl-6-oxo-7-nitro-6H-pyrrolo[3,2,1-ij]quinoline-5-carboxylic acid, m.p. 288° C. (dec.).

Analysis: Calculated for $C_{13}H_{10}N_2O_5$: %C, 57.0; %H, 3.7; %N, 10.2; Found: %C, 56.8; %H, 3.6; %N, 10.4.

EXAMPLE 4

A suspension of 1,2-dihydro-2-methyl-6-oxo-7-nitro-6H-pyrrolo[3,2,1-ij]quinoline-5-carboxylic acid (10.7 g, 0.389 mole) in 200 ml. of water is treated with 1 equivalent of potassium hydroxide to effect solution and 10 g. of Raney nickel is added. The mixture is treated with hydrogen gas (initial pressure 51 psi.) on a Parr apparatus until hydrogen uptake stops. The mixture is filtered and the filtrate is neutralized with acetic acid. The precipitate is separated by filtration, washed with water, recrystallized first from N,N-dimethylformamide, then from ethanol. The yellow product is 7-amino-1,2-dihydro-2-methyl-6-oxo-6H-pyrrolo[3,2,1-ij]quinoline-5-carboxylic acid, m.p. 295° to 299° C. (dec.), Analysis: Calculated for $C_{13}H_{12}N_2O_3$: %C, 63.9; %H, 5.0; %N, 11.5; Found: %C, 63.6; %H, 4.9; %N, 11.9.

EXAMPLE 5

Using the method of Example 3 1,2-dihydro-6-oxo-6H-pyrrolo[3,2,1-ij]quinoline-5-carboxylic acid is nitrated to provide 1,2-dihydro-6-oxo-7-nitro-6H-pyrrolo[3,2,1-ij]quinoline-5-carboxylic acid, m.p. 300° C. after recrystallization from N,N-dimethylformamide.

Analysis: Calculated for $C_{12}H_8N_2O_5$: %C, 55.4; %H, 3.1; %N, 10.8; Found: %C, 55.4; %H, 3.1; %N, 10.9.

EXAMPLE 6

7-Amino-1,2-dihydro-2-methyl-6-oxo-6H-pyrrolo[3,2,1-ij]quinoline-5-carboxylic acid (0.5 g; 0.00205 mole) is added to 10 ml. of stirred acetic anhydride and the mixture is heated to its reflux temperature and maintained at reflux for 2 hours. The mixture is then cooled, the solid product is separated by filtration then washed thoroughly with water. Recrystallization from ethanol provides yellow solid 7-acetamido-1,2-dihydro-2-methyl-6-oxo-6H-pyrrolo[3,2,1-ij]quinoline-5-carboxylic acid, m.p. 284°–287° C.

Analysis: Calculated for $C_{15}H_{14}N_2O_4$: %C, 62.9; %H, 4.9; %N, 9.8; Found: %C, 62.4; %H, 4.9; %N, 9.8.

EXAMPLE 7

Diethyl ethoxymethylenemalonate (23.3 g., 0.154 mole) and 5-fluoro-2-methylindoline (3.0 g., 0.020 mole) are stirred while heating the mixture at 100° to 125° C. under nitrogen for 2 hours. After cooling to about 25° C. polyphosphoric acid (100 g.) is added. The mixture is heated slowly to about 100° C., at which temperature the heat of reaction causes the reaction temperature to reach 125° to 130° C. External heat is removed and stirring continued. When the temperature decreases stirring is continued about 15 minutes, then the mixture is diluted with 500 ml. of warm water. Sodium hydroxide solution is then added to the cooled solution until the product separates. The colorless solid is separated by filtration and a sample is recrystallized from methanol. It is the desired ester, ethyl 1,2-dihydro-8-fluoro-2-methyl-6-oxo-6H-pyrrolo-[3,2,1-ij]quinoline-5-carboxylate, Analysis: Calculated for $C_{15}H_{14}FNO_3$: %C, 65.5; %H, 5.1; %N, 5.1; Found: %C, 65.2; %H, 5.2; %N, 5.2.

The remainder of the crude ester is saponified in excess sodium hydroxide solution by heating under reflux. The solution is cooled, the filtered. The filtrate is acidified with dilute hydrochloric acid. The product is separated by filtration, washed with water, then methanol, then diethyl ether, then recrystallized from N,N-dimethylformamide. Solid 1,2-dihydro-8-fluoro-2-methyl-6-oxo-6H-pyrrolo[3,2,1-ij]-quinoline-5-carboxylic acid melts at 285° to 288° C.

Analysis: Calculated for $C_{13}H_{10}FNO_3$: %C, 63.2; %H, 4.1; %N, 5.7; Found: %C, 63.1; %H, 4.0; %N, 5.8.

EXAMPLE 8

Ethyl 1,2-dihydro-6-oxo-6H-pyrrolo[3,2,1-ij]quinoline-5-carboxylate (8.0 g, 0.034 mole) is dissolved in 100 ml. of methanol. The mixture is stirred while adding excess 97% hydrazine (28 ml) and stirring is continued for a total of 1 hour. The solid product is separated by filtration, then washed with methanol. Recrystallization from water provides colorless needles of 1,2-dihydro-6-oxo-6H-pyrrolo[3,2,1-ij]quinoline-5-carbonyl hydrazide hydrate, m.p. 225° C. (dec.)

Analysis: Calculated for $C_{12}H_{11}N_3O_2 \cdot 1/2H_2O$; %C, 60.4; %H, 5.1; %N, 17.6; Found: %C, 60.1; %H, 5.4; %N, 17.6.

EXAMPLE 9

To a mixture of hot ethanol (125 ml.) and water (25 ml.) is added 1,2-dihydro-6-oxo-6H-pyrrolo[3,2,1-ij]-quinoline-5-carbonyl hydrazide (2.0 g., 0.0087 mole). After solution is obtained, a solution of 5-nitrofurfuraldehyde (1.2 g, 0.0087) mole in ethanol is added and the mixture is heated on a steam bath for 10 minutes. The product precipitates, the solution is cooled and the product is separated by filtration, then washed with ethanol. The yellow solid product is 1,2-dihydro-6-oxo-6H-pyrrolo[3,2,1-ij]quinoline-5-carboxylic acid 5-nitrofurfurylidene hydrazide, m.p. 300° C.

Analysis: Calculated for $C_{17}H_{12}N_4O_5$: %C, 58.0; %H, 3.4; %N, 15.9; Found: %C, 57.4; %H, 3.3; %N, 16.1.

EXAMPLE 10

7-Amino-1,2-dihydro-2-methyl-6-oxo-6H-pyrrolo[3,2,1-ij]quinoline-5-carboxylic acid in dilute hydrochloric acid is treated with one equivalent of sodium nitrite at 0° C. The mixture is then neutralized with sodium carbonate and added to a solution of a slight excess over one equivalent of cuprous chloride and two equivalents of sodium cyanide at 0° C., then the mixture is heated to 50° C. for about 15 minutes. Acidification provides the product, 7-cyano-1,2-dihydro-2-methyl-6-oxo-6H-pyrrolo[3,2,1-ij]quinoline-5-carboxylic acid which is purified by recrystallization and by extraction of impurities.

EXAMPLE 11

1,2-Dihydro-8-methoxy-2-methyl-6-oxo-6H-pyrrolo[3,2,1-ij]quinoline-5-carboxylic acid (prepared from 5-methoxy-2-methylindoline according to the method of claim 1) is added to 58% hydrobromic acid and the mixture is refluxed for 6 hours. The mixture is diluted with water to precipitate the product, 1,2-dihydro-8-hydroxy-2-methyl-6-oxo-6H-pyrrolo[3,2,1-ij]-quinoline-5-carboxylic acid.

EXAMPLE 12

Using the procedure described in Example 6, 7-amino-1,2-dihydro-2-ethyl-6-oxo-6H-pyrrolo[3,2,1-ij]quinoline-5-carboxylic acid is reacted with acetic anhydride to provide 7-acetamido-1,2-dihydro-2-ethyl-6-oxo-6H-pyrrolo[3,2,1-ij]-quinoline-5-carboxylic acid.

EXAMPLE 13

1,2-Dihydro-8-fluoro-2-methyl-6-oxo-6H-pyrrolo[3,2,1-ij]quinoline-5-carboxylic acid is dissolved in hot aqueous ethanol (75%) and an equimolar quantity of sodium hydroxide is added. After stirring briefly the mixture is filtered. The filtrate is evaporated under vacuum to provide a solid. The solid is dissolved in methanol, then precipitated by the addition of diethyl ether. The product is sodium 1,2-dihydro-8-fluoro-2-methyl-2-oxo-6H-pyrrolo[3,2,1-ij]quinoline-5-carboxylate.

EXAMPLE 14

A. Preparation of an acyl chloride derivative 1,2-Dihydro-8-fluoro-2-methyl-6-oxo-6H-pyrrolo[3,2,1-ij]quinoline-5-carboxylic acid is stirred with excess thionyl chloride and the mixture is heated at its reflux temperature for about 16 hours. The mixture is evaporated to dryness, then azeotroped twice with benzene to provide solid 1,2-dihydro-8-fluoro-2-methyl-6-oxo-6H-pyrrolo[3,2,1-ij]quinoline-5-carboxyl chloride.

B. Preparation of an amide derivative

A portion of the product of part A is added to excess ammonium hydroxide and the mixture is stirred for 3 hours. The precipitated solid is separated by filtration, washed with water and dried to provide 1,2-dihydro-8-fluoro-2-methyl-6-oxo-6H-pyrrolo[3,2,1-ij]quinoline-5-carboxamide.

C. Preparation of an N-substituted amide

A portion of the product of part A is added to excess morpholine and the mixture is stirred for 4 hours. The precipitated solid is separated by filtration, washed with water and dried to provide 1,2-dihydro-8-fluoro-2-methyl-6-oxo-6H-pyrrolo[3,2,1-ij]quinoline-5-carboxylic acid morpholine amide.

EXAMPLE 15

Using the method of Example 1 6-fluoroindoline is reacted with diethyl ethoxymethylene malonate to provide 1,2-dihydro-7-fluoro-6-oxo-6H-pyrrolo[3,2,1-ij]quinoline-5-carboxylic acid, m.p. 302°–305° C. The intermediate condensation product ethyl 2-carbethoxy-3-(6-fluoro-1-indolinyl)acrylate is isolated and characterized, m.p. 75°–77° C., Analysis: Calculated for $C_{16}H_{18}FNO hd 4$: %C, 62.5; %H, 5.9; %N, 4.6; Found: %C, 62.5; %H, 5.8; %N, 4.5.

The following table exemplified additional compounds of the invention.

Table I

| Ex. No. | Starting Indoline | Final Product |
| --- | --- | --- |
| 16 | 2,5-dimethylindoline | 1,2-dihydro-2,8-dimethyl-6-oxo-6H-pyrrolo[3,2,1-ij]quinoline-5-carboxylic acid |
| 17 | 2-methyl-5-trifluoromethylindoline | 1,2-dihydro-2-methyl-6-oxo-8-trifluoromethyl-6H-pyrrolo[3,2,1-ij]quinoline-5-carboxylic acid |
| 18 | 4-methoxyindoline | 1,2-dihydro-9-methoxy-6-oxo-6H-pyrrolo[3,2,1-ij]quinoline-5-carboxylic acid |
| 19 | 6-chloroindoline | 7-chloro-1,2-dihydro-6-oxo-6H-pyrrolo[3,2,1-ij]quinoline-5-carboxylic acid |
| 20 | 2-ethylindoline | 1,2-dihydro-2-ethyl-6-oxo-6H-pyrrolo[3,2,1-ij]quinoline-5-carboxylic acid |

What is claimed is:

1. A compound of the formula:

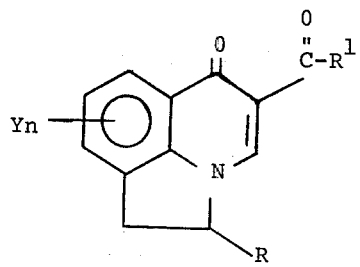

wherein R is methyl, ethyl, or hydrogen; Y is alkyl having 1 to 6 carbon atoms, alkoxy having 1 to 6 carbon atoms, halogen, hydroxy, nitro, cyano, trifluoromethyl, amino, alkanamido having 1 to 6 carbon atoms, or N-N-dialkylamino having 1 to 6 carbon atoms; $n$ is zero, one or two, and when $n$ is two, Y may be methylenedioxy (—OCH$_2$O—) or ethylenedioxy; and R$^1$ is —OH, OM$^1$ wherein M$^1$ is metal or ammonium, halide, —NHNH$_2$,

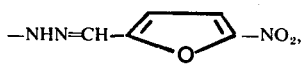

—OR$^4$ wherein R$^4$ is alkyl having 1 to 6 carbon atoms; or

wherein R$^2$ and R$^3$ are hydrogen or alkyl having 1 to 6 carbon atoms, or R$^2$ and R$^3$ taken together with the nitrogen atom to which they are attached are piperidino or pyrrolidino.

2. A compound of the formula:

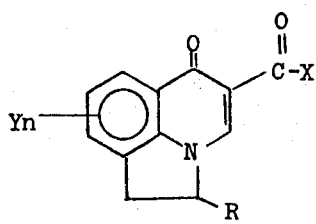

wherein R is hydrogen, methyl or ethyl, Y is methyl, methoxy, fluorine, chlorine or acetamido, and when $n$ is two Y may be methylenedioxy or ethylenedioxy bonded to adjacent ring positions and when $n$ is two each Y may be the same or different, n is one or two and X is -OH,

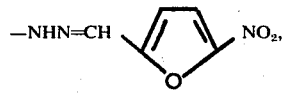

or —OM and M is a pharmaceutically acceptable cation.

3. 1,2-Dihydro-6-oxo-6H-pyrrolo[3,2,1-ij]quinoline-5-carboxylic acid and pharmaceutically useful salts thereof according to claim 1.

4. Ethyl 1,2-dihydro-2-methyl-6-oxo-6H-pyrrolo[3,2,1-ij]quinoline-5-carboxylate according to claim 1.

5. 1,2-Dihydro-2-methyl-6-oxo-6H-pyrrolo[3,2,1-ij]-quinoline-5-carboxylic acids and alkali and alkaline earth metal salts thereof according to claim 1.

6. 1,2-Dihydro-2-methyl-7-nitro-6-oxo-6H-pyrrolo-[3,2,1-ij]quinoline-5-carboxylic acid and alkali and alkaline earth metal salts thereof according to claim 1.

7. 7-Amino-1,2-dihydro-2-methyl-6-oxo-6H-pyrrolo-[3,2,1-ij]quinoline-5-carboxylic acid and alkali and alkaline earth metal salts thereof according to claim 1.

8. 1,2-Dihydro-7-nitro-6-oxo-6H-pyrrolo[3,2,1-ij]-quinoline-5-carboxylic acid and alkali and alkaline earth metal salts thereof according to claim 1.

9. 7-Acetamido-1,2-dihydro-2-methyl-6-oxo-6H-pyrrolo[3,2,1-ij]quinoline-5-carboxylic acid and alkali and alkaline earth metal salts thereof according to claim 1.

10. Ethyl 1,2-dihydro-8-fluoro-2-methyl-6-oxo-6H-pyrrolo[3,2,1-ij]quinoline-5-carboxylate according to claim 1.

11. 1,2-Dihydro-8-fluoro-2-methyl-6-oxo-6H-pyrrolo-[3,2,1-ij]quinoline-5-carboxylic acid and alkali and alkaline earth metal salts thereof according to claim 1.

12. 1,2-Dihydro-6-oxo-6H-pyrrolo[3,2,1-ij]quinoline-5-carbonyl hydrazide hydrate according to claim 1.

13. 1,2-Dihydro-6-oxo-6H-pyrrolo[3,2,1-ij]quinoline-5-carboxylic acid 5-nitrofurfurylidene hydrazide according to claim 1.

14. 7-Cyano-1,2-dihydro-2-methyl-6-oxo-6H-pyrrolo-[3,2,1-ij]quinoline-5-carboxylic acid and pharmaceutically useful salts thereof according to claim 1.

15. 1,2-Dihydro-8-hydroxy-2-methyl-6-oxo-6H-pyrrolo-[3,2,1-ij]quinoline-5-carboxylic acid and pharmaceutically useful salts thereof according to claim 1.

16. 7-Acetamido-1,2-dihydro-2-ethyl-6-oxo-6H-pyrrolo-[3,2,1-ij]quinoline-5-carboxylic acid and pharmaceutically useful salts thereof according to claim 1.

17. 1,2-Dihydro-8-fluoro-2-methyl-6-oxo-6H-pyrrolo-[3,2,1-ij]quinoline-5-carboxyl chloride according to claim 1.

18. 1,2-Dihydro-8-fluoro-2-methyl-6-oxo-6H-pyrrolo-[3,2,1-ij]quinoline-5-carboxamide according to claim 1.

\* \* \* \* \*

UNITED STATES PATENT OFFICE
CERTIFICATE OF CORRECTION

PATENT NO. : 3,917,609
DATED : November 4, 1975
INVENTOR(S) : JOHN F. GERSTER

It is certified that error appears in the above-identified patent and that said Letters Patent are hereby corrected as shown below:

Col. 5, line 13, change "hereinabvoe" to -- hereinabove --.

Col. 5, line 14, change "hereinabove" to -- lower --.

Col. 10, line 35 (Example 15), change "$C_{16}H_{18}FNOhd4$:" to -- $C_{16}H_{18}FNO_4$: --.

Signed and Sealed this thirtieth Day of March 1976

[SEAL]

Attest:

RUTH C. MASON
Attesting Officer

C. MARSHALL DANN
Commissioner of Patents and Trademarks